United States Patent Office 3,163,114
Patented Dec. 29, 1964

3,163,114
DEVICE FOR THE AUTOMATIC CONTROL OF THE VOLUME OF THE AIR CUSHION IN THE PRESSURE TANK OF WATER SUPPLY SYSTEMS
Otto Kracht, Werdohl, Germany, assignor to Kracht Pumpen- und Motorenfabrik K.G., Werdohl, Germany
Filed Mar. 28, 1962, Ser. No. 183,094
Claims priority, application Germany Mar. 29, 1961
7 Claims. (Cl. 103—6)

This invention relates to a device for the automatic control of the volume of the air cushion in the pressure tank of water supply systems comprising a regulator tank parallel with the storage or pressure tank and connected to the same by means of a pipe in the region of the water contained therein and further by a pipe in the region of the air cushion contained therein, the former of these connecting pipes having a reversing valve which in one position establishes a connection between the water space of the pressure tank and that of the regulator tank, whilst at the same time a non-pressure discharge pipe of the regulator tank is closed, and which in the other position shuts off the supply of water from the pressure tank to the regulator tank and provides a connection between the regulator tank and said discharge pipe.

Known devices of this type have float-actuated valves by means of which the liquid contained in the regulator tank, after having displaced the air through the upper connecting pipe into the pressure tank, is discharged when the liquid level in the regulator tank has reached a predetermined level, whereupon the regulator tank is replenished with air through a check valve. Such known float-control systems have the disadvantage that they prevent the function of the valves and joints inside the regulator tank due to the incrustation or impurity. Also, the buoyancy of float available for actuating the inlet and outlet valve is low.

A control device has also been proposed in which the reversing valve is actuated by a manometric switch actuated by a low-boiling pressure medium, electrical heating means being provided for heating the pressure medium, and in which control means are provided to activate or inactivate the electrical control means in dependence on the level of the water in the regulator tank. Said control means comprise a float pivotally mounted in the upper region of the regulator tank. In principle, this known arrangement operates in a satisfactory manner but is very expensive in construction.

The object of the present invention is to provide in water supply systems of the character described a control device for the air cushion in the pressure tank of water supply systems which is not subject to breakdowns and is simple in construction.

According to the invention the reversing valve is in the form of an electromagnetically actuated three-way valve operated in dependence on the actuation of the pump, or operated by a separate control relay.

The magnetic valve is preferably directly connected to the current supply for the pump motor so that the magnetic valve is actuated whenever the motor is started.

In another embodiment the magnetic valve is actuated by a time-lag relay. The magnetic valve may also be actuated in dependence on the level of the liquid above the regulator tank by means of a water-level signal device from a time-lag relay.

The invention is further described with reference to the accompanying drawings which illustrate several embodiments by way of example and in which.

Figure 1:
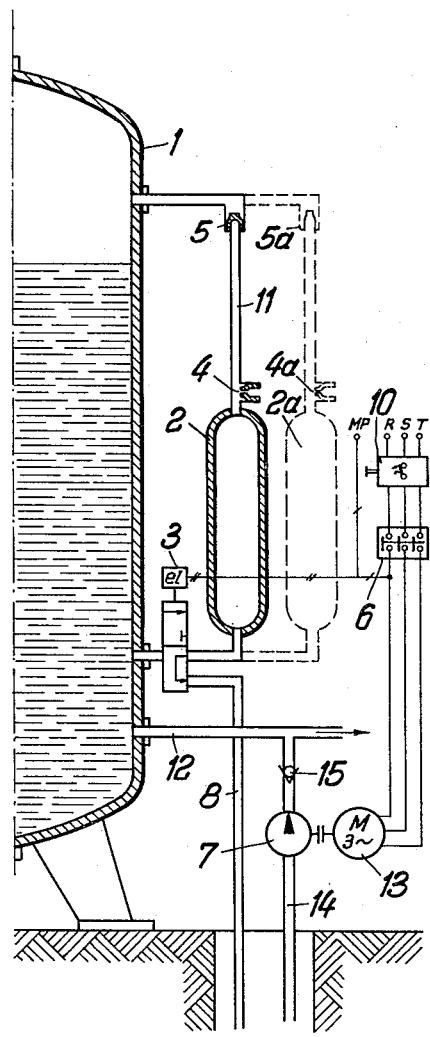
FIG. 1 shows a preferred embodiment of a control device according to the invention.

In all of the embodiments, a regulator tank 2 is connected in parallel to a pressure tank 1, the regulator tank 2 being connected to the pressure tank through an electromagnetically-actuated three-way valve 3 and a pressureless discharge pipe 8. At the upper end of the regulator tank 2 connected with the air space of the pressure tank by means of a pipe 11, there is located an air intake valve 4 which is known as a "snifter valve." In the region of the air cushion, the pipe 11 is closed by a check valve 5 which prevents the escape of air from the pressure tank.

The pump 7 driven by a motor 13 sucks up water through a well pipe 14 and delivers it to the pressure tank through a check valve 15 and a pipe 12, the latter being then lead, as shown by the arrow, to the consumer.

The motor 13 is actuated by means of a contactor 6 which is operated by the known type of pressure switch 10 which operates in response to the pressure in the pressure tank 1 and is normally directly attached to the same.

Figure 2:
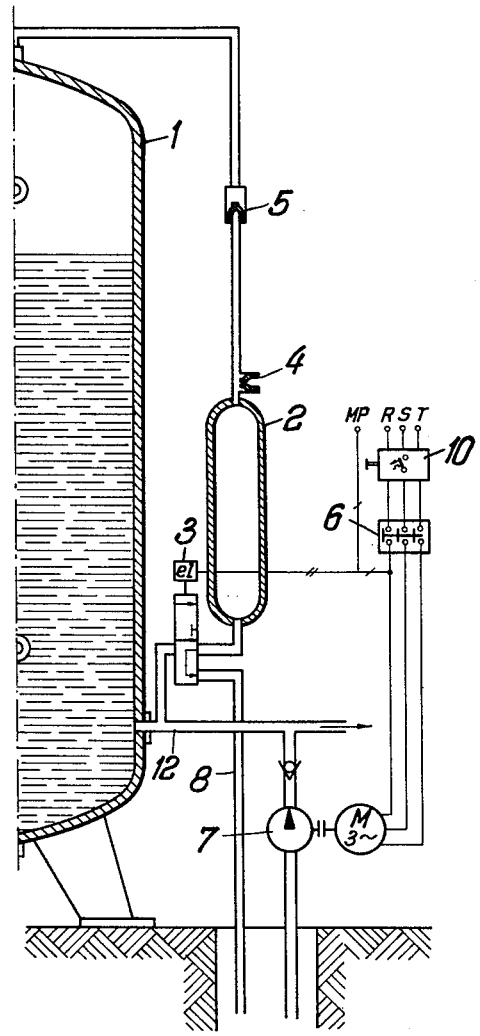
FIG. 2 shows a modification of the embodiment of FIG. 1.
Figure 3:
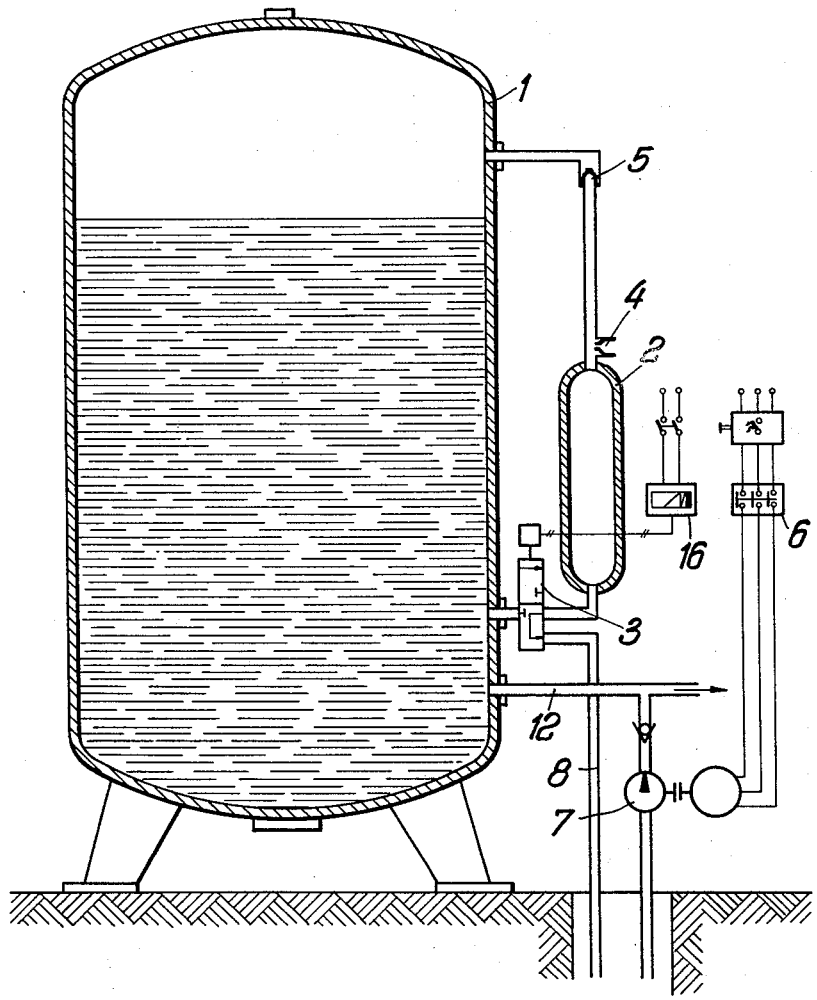
FIGS. 3 and 4 show two more embodiments.

In currentless condition the magnetic valve 3 connects the inside of the regulator tank 2 with the discharge pipe 8. This position is shown in FIGS. 1, 2 and 3. When the magnet is energised, the valve reverses to permit pressure water to flow into the regulator tank 2, whilst the discharge pipe 8 is closed.

In the embodiment according to FIG. 1 the magnetic valve is mounted at a connecting sleeve to the tank. This can be the connecting sleeve normally provided for the water-level indicator, for example, to which the regulator tank can be parallel.

In the embodiment shown in FIG. 2 the magnetic valve is connected to the pressure pipe 12 direct.

The magnetic valve connections are preferably selected in such a manner that their inner diameter is smaller than the diameter of the main pressure pipe or the connecting pipes to the water-level indicator when the regulator tank is connected in parallel to the water-level indicator. In particular, when the magnetic valve is connected to the connecting pipes to the water-level indicator, the small diameter of the magnetic valve prevents air from being sucked from the air cushion in the pressure tank through the water-level indicator when water flows into the regulator tank.

In the embodiments according to FIGS. 1 and 2 the electromagnet of the valve 3 is directly connected to the current supply line of the motor 13, the point of connection being either in or after the relay. Connection is best made between one phase of the motor and the neutral conductor. Thus, whenever the motor is switched on, the following operation takes place:

When the electromagnet of the valve 3 is energised the valve provides a connection between the pressure tank or the main pressure pipe and the regulator tank 2 so that water may flow into the empty regulator tank. This pressure water compresses the air contained in the regulator tank and forces it into the air space of the pressure tank through the check valve 5. When the motor is switched off also the magnet of the valve 3 is currentless and the valve returns to its position shown in FIGS. 1 and 2, in which the water may flow out of the regulator tank through the discharge pipe 8 to returning to the well and air is sucked off through the snifter valve 4. When the motor is again switched on, the above-described cycle recurs.

When the level of liquid in the pressure tank 1 exceeds below the level at which the check valve 5 is located, the pressure water inside the regulator tank 2 or the pipe 11 will not reach the check valve so that there remains an air cushion in the pipe 11 or in the upper part of the regulator tank 2. If the fluid level in the pressure tank drops still more, this air cushion will assume a volume that the air inside the regulator tank or the pipe 11 cannot be compressed to such a degree that it enters the pressure tank through the check valve 5. The regulator tank 2 and the check valve 5 must therefore be located at such a height that the supply of air into the air space in the pressure tank ceases as soon as the air cushion in the pressure tank has reached the desired volume. When this is the case, no more air will be supplied to the pressure tank even though the regulator tank continues to operate whenever the pump is switched on, but the compressed air in the regulator tank expands again on discharge of the pressure water from the regulator tank.

In the arrangement described above the regulator tank may have a relatively small capacity, for example in the order of five litres. With pressure tanks of larger capacity more air is naturally required. Such cases are best covered by connecting two regulator tanks in parallel, the second regulator tank 2a, which is illustrated in FIG. 1 in dash lines, having to be provided with its own snifter valve 4a and check valve 5a. This parallel connection of two regulator tanks simplifies production considerably.

In the embodiment shown in FIG. 3 the magnet of the valve 3 is actuated by means of a time-lag relay which automatically opens and closes the circuit periodically. Relays can be used having a very long time-lag. The least time-lag depends on the length of an operating cycle in the regulator tank. In this case the regulator tank operates independently of the pump. The delivery of air from the regulator tank into the pressure tank also ceases in this case when the maximum water level adjusted is reached in the pressure tank. The embodiment shown in FIG. 3 is particularly useful where the air cushion is to be replenished from time to time only, whilst in the meantime the relay 16 is rendered inactive through a conventional switch. However, it is, of course, also possible for the relay to be maintained continuously operative in plants where the air consumption is high through absorption, for example in plants having a high water consumption, where the pump is switched off at very long intervals.

Figure 4:
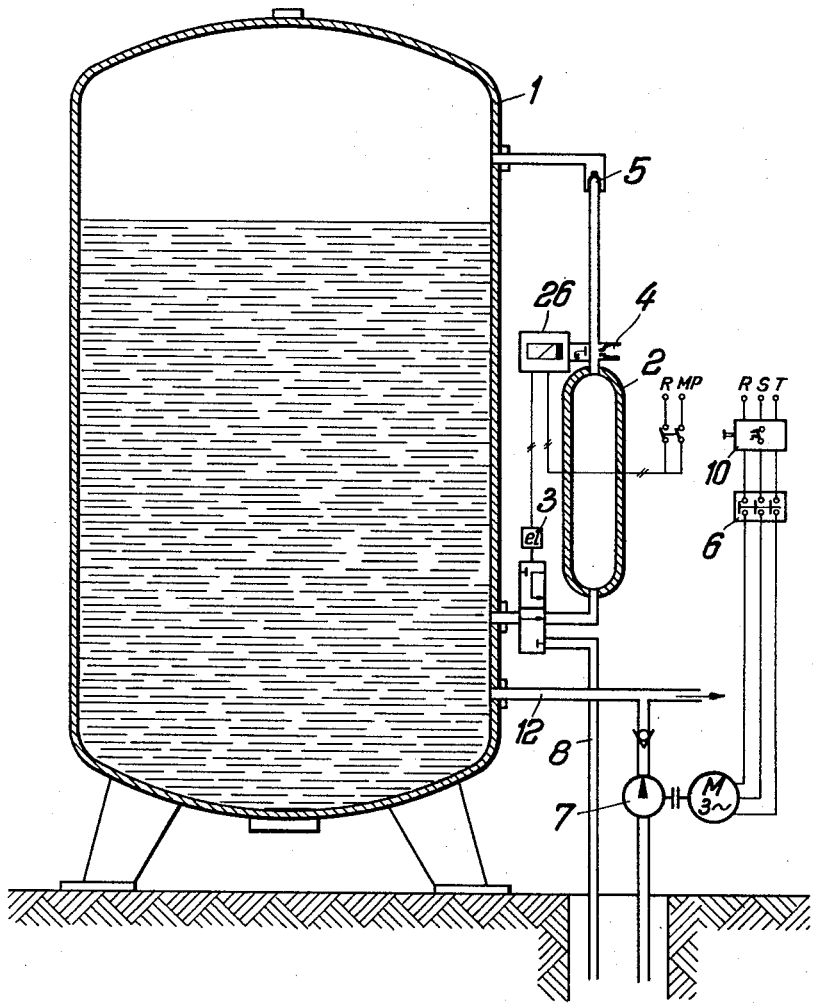

The embodiment according to FIG. 4 includes a capacity water-level signal device 26 which operates in response to the water-level in the regulator tank but without coming into contact with the liquid water itself. If the liquid level in the regulator tank exceeds the water-level signal device 26, the valve 3 is actuated so that the water can flow out of the regulator tank. The water-level signal device 26 has a time-lag switching device which ensures that the valve 3 does not reverse until the regulator tank is emptied. When the desired water level in the pressure tank has been attained, the liquid in the regulator tank no longer reaches the water-level signal device so that the valve 3 remains in its position and the delivery of air ceases.

What I claim is:

1. A water supply system comprising a pressure tank, at least one regulator tank parallel with said pressure tank, a water flow connection between said pressure tank and the lower end of said regulator tank, an air flow connection between said pressure tank and the upper end of said regulator tank, a check valve in said air flow connection allowing flow of air from said regulator tank into said pressure tank and precluding at all times flow of air from said pressure tank into said regulator tank, an inwardly opening check valve arranged in said air flow connection between said first check valve and the upper end of said regulator tank for admitting air from the atmosphere into said regulator tank when the air pressure is said regulator tank drops below atmospheric pressure, a discharge pipe for said regulator tank, an electromagnetically actuated three-way valve in said water flow connection and further connected to said discharge pipe, said valve opening said water flow connection and shutting off said discharge pipe in one position and shutting off said water flow connection and opening a connection between said regulator tank and said discharge pipe in its other position, a pump delivering water directly into said pressure tank, a motor driving said pump, and electrically operated means actuating said three-way valve.

2. A device as defined in claim 1, in which said three-way valve is directly connected to the current supply line for said motor.

3. A device as defined in claim 1, in which the magnetic valve is actuated by a time-lag relay.

4. A device as defined in claim 1, in which the magnetic valve is actuated in dependence on the level of the water above the regulator tank by means of water-level signal device and a time-lag relay.

5. A device as defined in claim 1, in which two regulator tanks are provided which are connected in parallel and are each provided with said check valves.

6. A device as defined in claim 1, in which the regulator tank is connected in parallel to the water-level indicator of the pressure tank.

7. A device as claimed in claim 1, characterized in that the inner diameter of the three-way valve is smaller than the inner diameter of the water supply pipe.

References Cited in the file of this patent

UNITED STATES PATENTS

| | | |
|---|---|---|
| 1,552,088 | Smith | Sept. 1, 1925 |
| 1,749,877 | Fisher | Mar. 11, 1930 |
| 2,172,057 | Burks | Sept. 5, 1939 |
| 2,621,597 | Armstrong et al. | Dec. 16, 1952 |
| 2,692,558 | Garrett | Oct. 26, 1954 |
| 2,709,964 | Brady | June 7, 1955 |
| 2,839,001 | Tubbs | June 17, 1958 |
| 2,845,082 | Kracht | July 29, 1958 |

FOREIGN PATENTS

| | | |
|---|---|---|
| 208,710 | Austria | Apr. 25, 1960 |